United States Patent [19]
Tanaka

[11] Patent Number: 5,740,693
[45] Date of Patent: Apr. 21, 1998

[54] PHOTOELECTRIC LEVELNESS DETECTOR

[75] Inventor: Yuzuru Tanaka, Daito, Japan

[73] Assignee: Daishowa Seiki Co., Ltd., Osaka, Japan

[21] Appl. No.: 490,028

[22] Filed: Jun. 13, 1995

[30] Foreign Application Priority Data

Jun. 13, 1994 [JP] Japan ................... 6-130513
Apr. 14, 1995 [JP] Japan ................... 7-89638

[51] Int. Cl.⁶ ........................................ G01F 23/00
[52] U.S. Cl. ........................................ 73/293
[58] Field of Search ........................ 73/293; 250/577

[56] References Cited

U.S. PATENT DOCUMENTS

| | | | |
|---|---|---|---|
| 1,772,908 | 8/1930 | Mahon | 73/293 |
| 2,194,625 | 3/1940 | Vermohlen | 73/293 |
| 2,362,872 | 11/1944 | Weagle | 72/293 |
| 3,128,626 | 4/1964 | Faber | 73/293 |
| 3,452,208 | 6/1969 | Giltinan | 73/293 |
| 3,511,572 | 5/1970 | Peube et al. | 73/293 |
| 4,193,004 | 3/1980 | Lobdell et al. | 250/577 |
| 4,297,588 | 10/1981 | Hastbacka | 250/577 |

*Primary Examiner*—William L. Oen
*Attorney, Agent, or Firm*—Schweitzer Cornman Gross & Bondell LLP

[57] ABSTRACT

The invention is a level detector having an elongated level tube containing a bubble in a liquid, a detector body enveloping and supporting the level tube, a projector for emitting light, a reflector for directing the emitted light across the level tube, a photoelectric sensor for sensing the light arriving from the level tube, the sensor having a plurality of separate photoelectric receptor elements, a discriminator circuit for identifying selected receptor elements to determine the location of light arriving across the level tube without interference by the bubble therein and thus to detect the levelness of the detector body and of any surface on which the body is disposed, and at least one level indicator for providing a readout of the levelness.

17 Claims, 7 Drawing Sheets

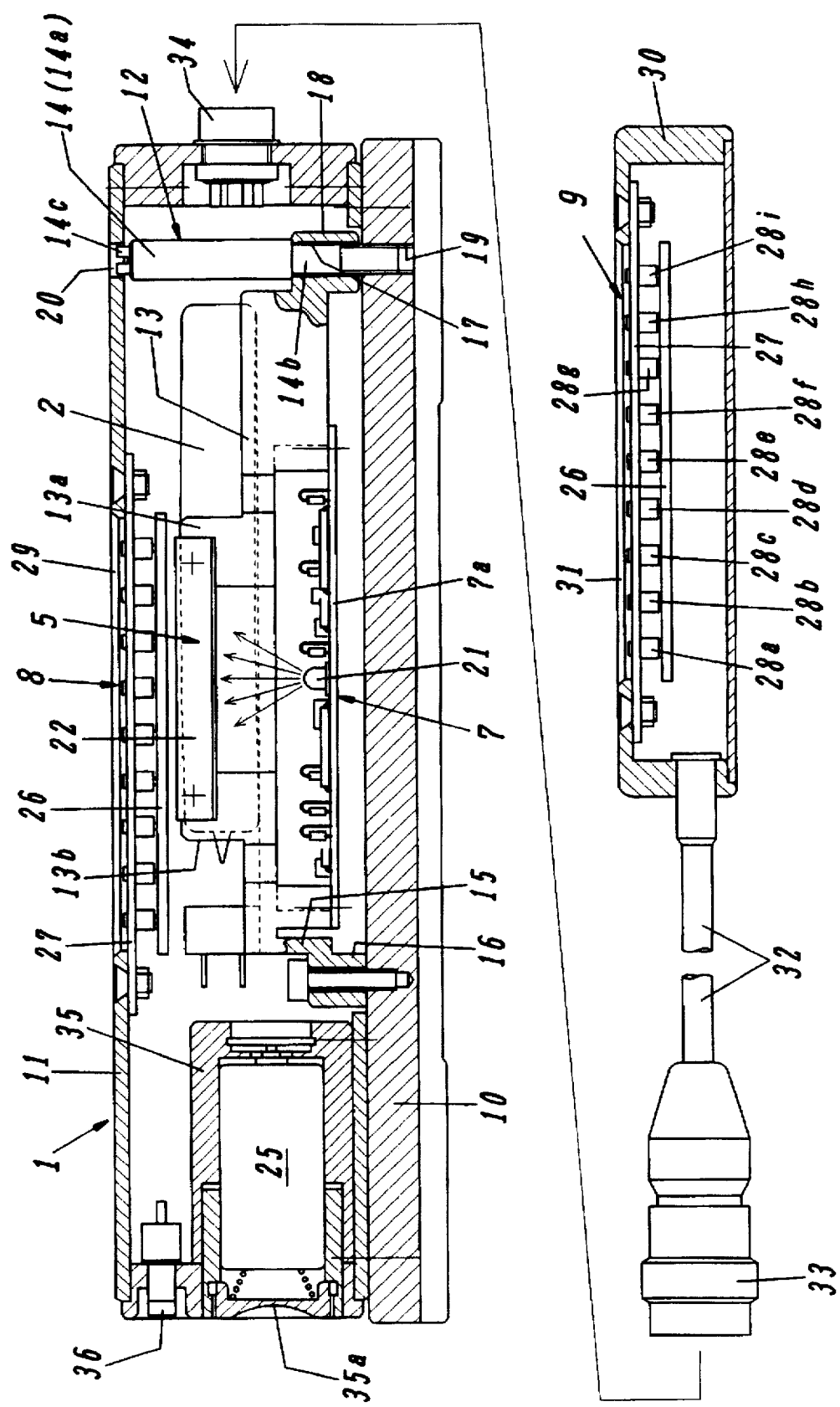

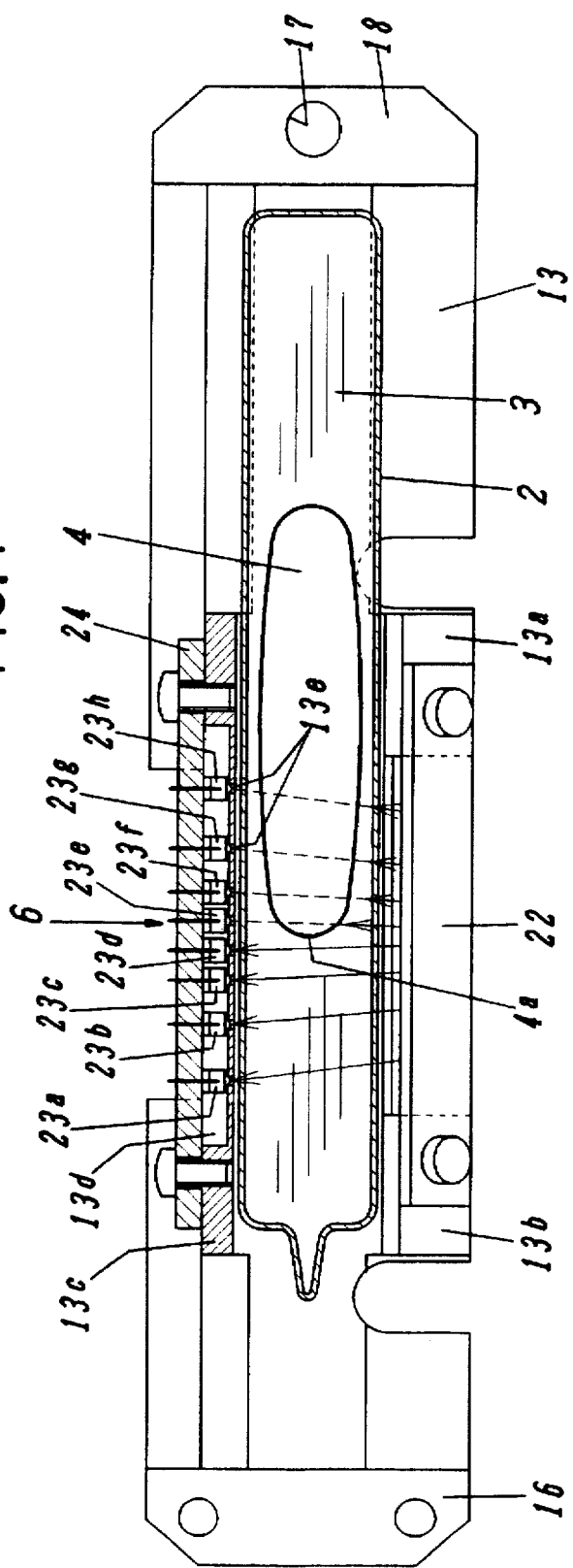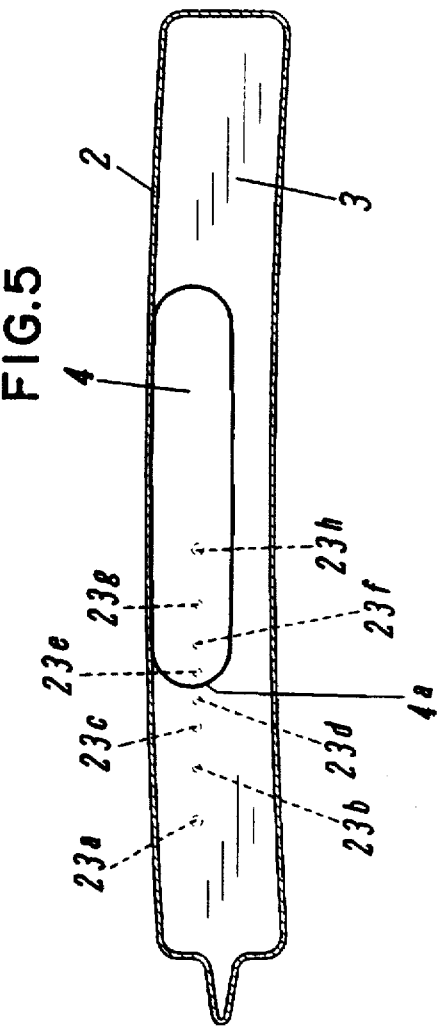

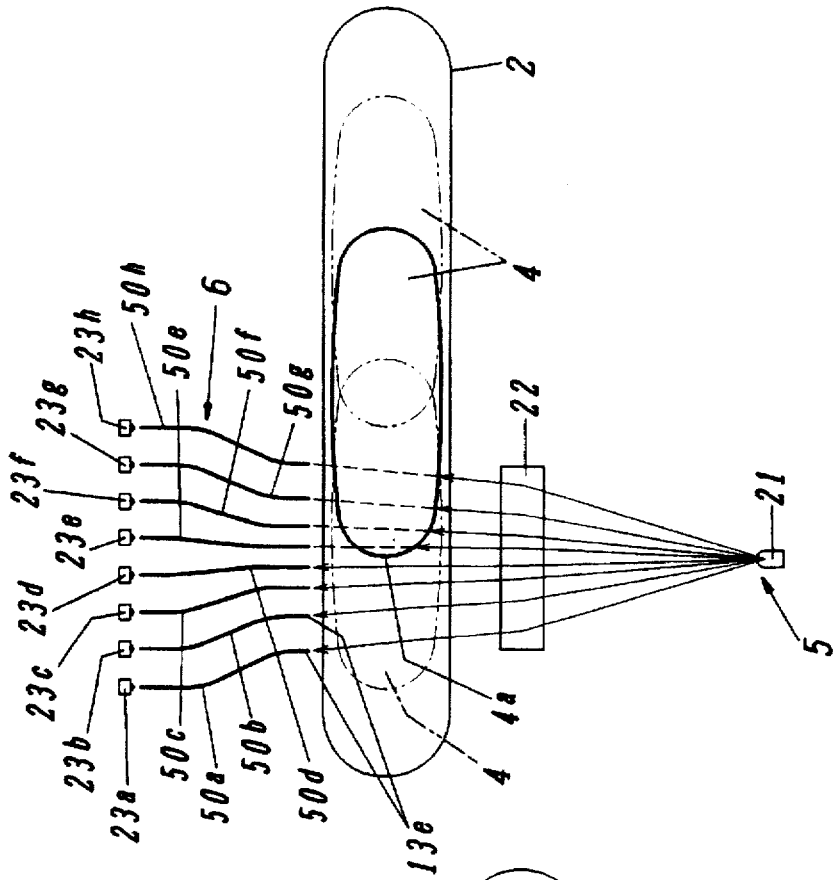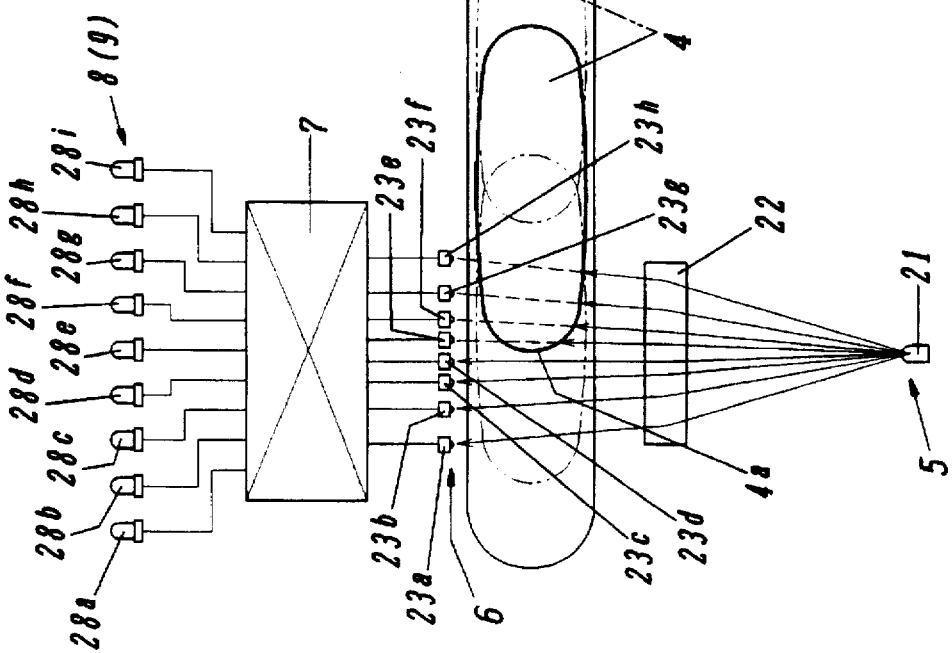

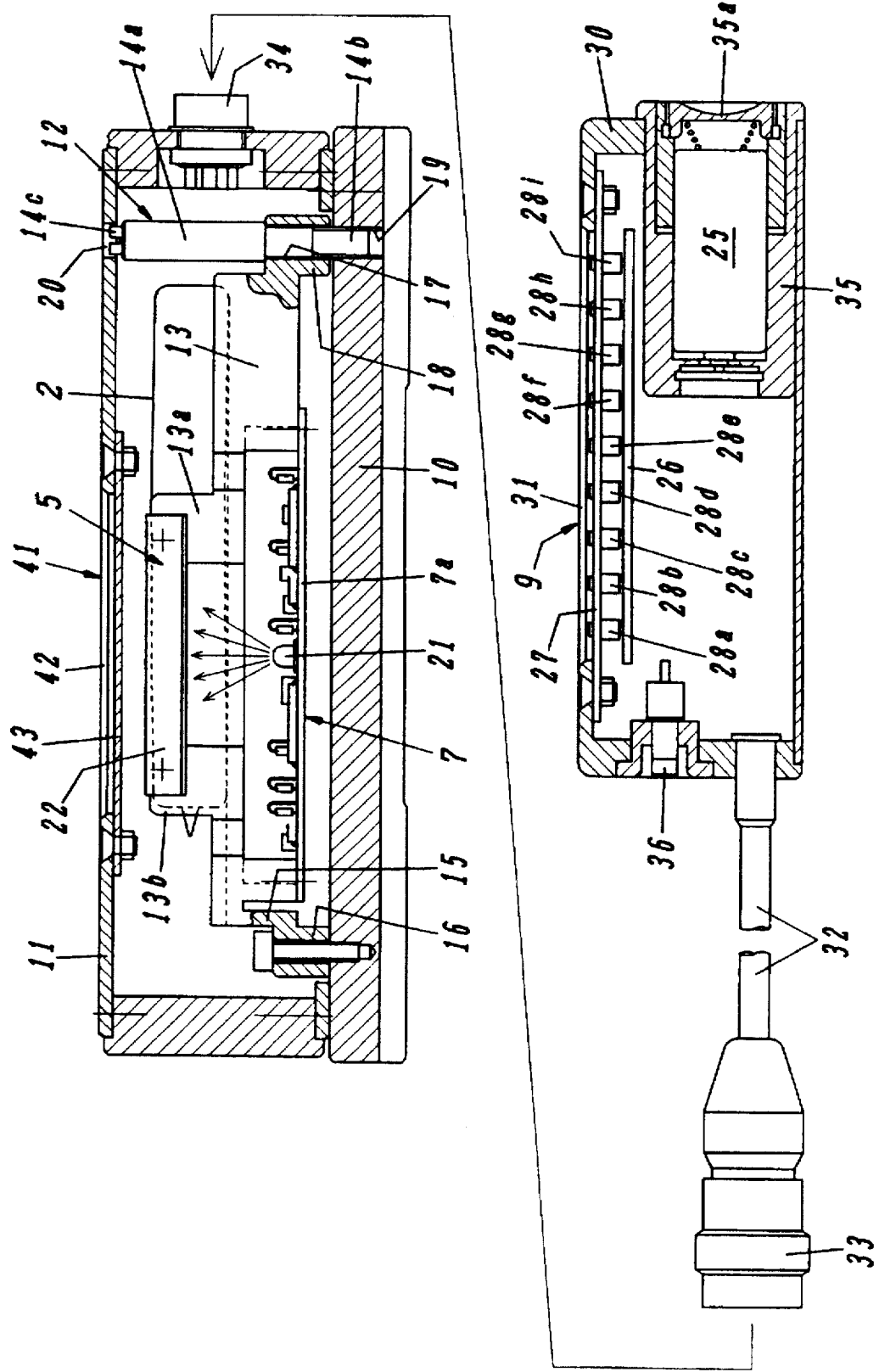

PHOTOELECTRIC LEVELNESS DETECTOR

FIELD OF THE INVENTION

The present invention relates to a level detector having a tube containing a bubble in a liquid, for automatically detecting and indicating whether a surface of an object to be tested is horizontal or inclined.

BACKGROUND OF THE INVENTION

Many kinds of automatic level detectors of this kind are known in the prior art. For example, one level detector is arranged so that electrodes are installed within a bubble-containing tube charged with an electrolytic solution, wherein the movement of the bubble within the tube brings about a change in an electric output according to the levelness (i.e. inclination) of the surface to be tested.

Published Japanese Patent Application No. S57-166511 shows a level detector, a resistor within a bubble-containing tube charged with an electrically conducting liquid and the resistor is exposed to the bubble. The movement of the bubble brings about a change in resistance of the resistor to enable the detection of levelness of the surface to be tested.

Published Japanese Utility Model Application No. S60-530074 discloses a level detector wherein a bubble-containing tube is charged with a magnetic fluid and is surrounded externally by a part of a differential transformer, wherein the movement of the bubble brings about a change in an electric output according to the levelness of the surface to be tested.

Yet another level detector, which is shown in published Japanese Utility Model Application No. S 52 - 75456 is arranged so that a bubble containing tube charged with an opaque liquid is interposed between a light emitting element and a photosensitive element, wherein light passing through the bubble within the tube makes a switching circuit to energize some indication lamps and an alarm buzzer according to levelness of the surface to be tested.

The liquids used in the prior art within the level tubes of the conventional level detectors are each of a special nature and thus on create various problems. More specifically, the create problems not only in the motility and unification of the bubble within the tube, but also present problems in the stability of the liquids. The accuracy of measurement and durability of the detectors require improvement and the special liquids are costly. A further high cost element is the installation of electrodes or resistors in the tube. Also, the entire structure of the detector becomes too complicated when a differential transformer is arranged around the tube. A relatively large bubble of a relatively large body capable of touching directly the inside wall of the tube is required in the design using the light-emitting element and the photosensitive element for complete passage of the light beams through the tube to produce an accurate measurement.

SUMMARY OF THE INVENTION

An object of the present invention is to provide a level detector which can accurately automatically detect and indicate the levelness of the surface of an object to be tested, using a common level tube of the conventional eye observation type without requiring any specialized liquid or any electric resistor or electrodes.

Another object of the present invention is to provide an automatic level detector which is superior in operational reliability and durability and can be manufactured with a simple structure and at a reduced cost.

The present invention is partially based on and developed from the phenomenon that a transparent liquid such as alcohol or ether has a refractive index which differs substantially from that of a gas such as air that forms the bubble, but is nearly equal to that of the glass or transparent plastic material of the level tube. Where a plurality or photosensitive elements are disposed in a line in the back of a level tube containing a bubble in a liquid, some light from a projector travelling toward a bubble-containing tube, is substantially reflected or refracted at the interface between the bubble and the liquid within the tube, so that it will not hit one or more photosensitive elements at the back of the bubble. Some light beams pass straight through the tube and those that hit the bubble are sharply refracted thereby, whereas those that are not so refracted pass through with minimum alteration of their path and then hit the photoelectric elements that are in an area remote from the back of the bubble. Only those photosensitive elements react and generate and electric output that are irradiated by light beams. However, when the tube is laid on a sloping surface the bubble moves within the tube in which there are various combinations of the reacting photoelectric elements that generate electric outputs in response to being hit by the light beams. Therefore, a level detector of the present invention has a light receptor disposed along one side of the tube, associated with a discriminator circuit for detecting degrees of levelness from the particular combinations of the photoelectric receptor elements irradiated by the light, and then energize a levelness indication for giving a visual and/or an audio signal.

Accordingly, the present invention is a level detector having an elongated level tube containing a bubble in a liquid, a detector body enveloping and supporting the level tube, a projector for emitting light, a reflector for directing the emitted light across the level tube, a photoelectric sensor for sensing the light arriving from the level tube, the sensor having a plurality of separate photoelectric receptor elements, a discriminator circuit for identifying selected receptor elements to determine the location of light arriving across the level tube without interference by the bubble therein and thus to detect the levelness of the detector body and of any surface on which the body is disposed, and at least one level indicator for providing a readout of the levelness.

The level detector of the present invention enables detection of the levelness of a surface and provides automatic accurate indication by using a common level tube of the conventional eye observation type without requiring any specialized liquid or any resistor or electrodes. The level detector of the present invention is relatively uncomplicated and inexpensive, with superior operational reliability and durability.

BRIEF DESCRIPTION OF THE DRAWING

FIG. 3 is a longitudinal cross-sectional view of the embodiment of FIG. 1;

FIG. 4 is a partial plan view, partially in cross section of the main part of the embodiment of FIG. 1;

FIG. 5 is a longitudinal cross sectional view of the level tube containing a bubble in a liquid, used in the embodiment of FIG. 1;

FIG. 6 is a schematic plan view of the invention, illustrating an arrangement of a detecting system in relation to the bubble-containing level tube in the embodiment of FIG. 1;

FIG. 7 is a schematic plan view, illustrating a modification of the photosensitive elements of FIG. 6;

FIG. 12 is a longitudinal cross-sectional view of the embodiment of FIG. 10.

DETAILED DESCRIPTION

Figure 1:
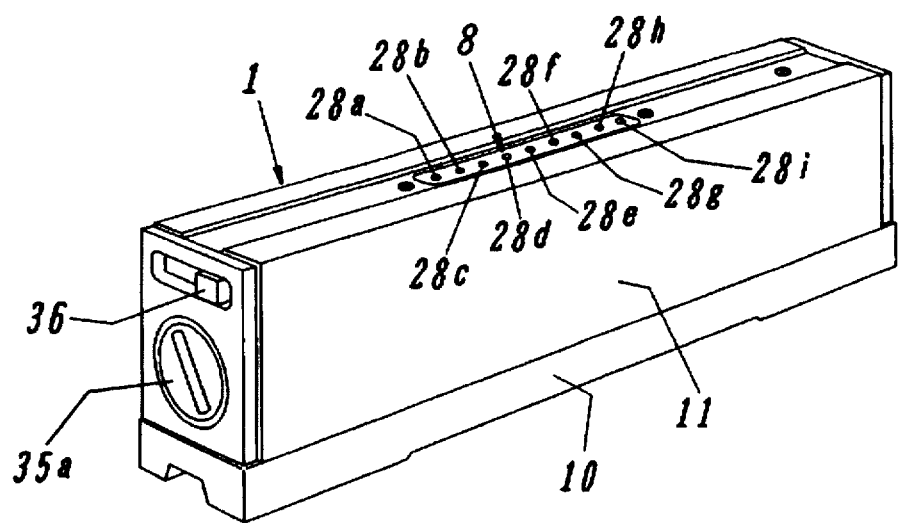
FIG. 1 is a perspective view of a first embodiment of a level detector according to the invention.

FIGS. 1 to 6 show a first embodiment of a level detector of the present invention. In FIGS. 1 to 4, a body 1 of the level detector has a base 10 and an elongated rectangular case 11, accommodating a bubble-containing level tube 2 charged with a small bubble 4 and a transparent liquid 3 such as alcohol or ether. The case 11 further contains a projector 5 for emitting light beams to travel toward the bubble containing level tube 2, a photoelectric sensor 6 adapted to react to light beams passing through the tube 2, a discriminator circuit 7 for discriminating different outputs of the sensor, and an internal level indicator 8 for indicating the levelness of the detector body 1 to an operator. An external level indicator 9 (FIG. 3) indicates levelness to an operator who is remote from the detector body 1.

As shown in FIG. 3, an adjusting mechanism 12 is interposed between the bubble-containing level tube 2 and the base 10 supporting the level tube from the base. The adjusting mechanism 12 has a bed 13 for stabilizing the level tube and a screw shaft 14 for adjusting the vertical location of the bed 13 relative to the base 10. The bed 13 has an elongated concave portion in its upper face for steady support of the level tube 2. One end of the bed 13 is formed into an intervening spring plate-like portion 15 secured to a base 16. The opposite end 18 of the bed 13 has a vertical slot 17 for the screw shaft 14, spaced slightly upwardly from an upper face of the base 10. The screw shaft 14 has an upper smooth shank portion 14a, a lower threaded portion 14b, and a slitted head 14c. The upper shank portion 14a has a larger diameter than the lower threaded portion 14b. The slitted head 14c can be manually adjusted by the operator. The lower threaded portion 14b is inserted into the vertical slot 17 and is screwed into a threaded female receptacle 19 formed in the base 10. A stepped shoulder is formed in the longitudinal center of the screw shaft 14 to regulate the orientation of the bed 13 by contacting an upper face of the bed end 18. The slitted head 14c is exposed to the outside of the detector in an opening 20 formed in a top of the case 11.

Figure 2:
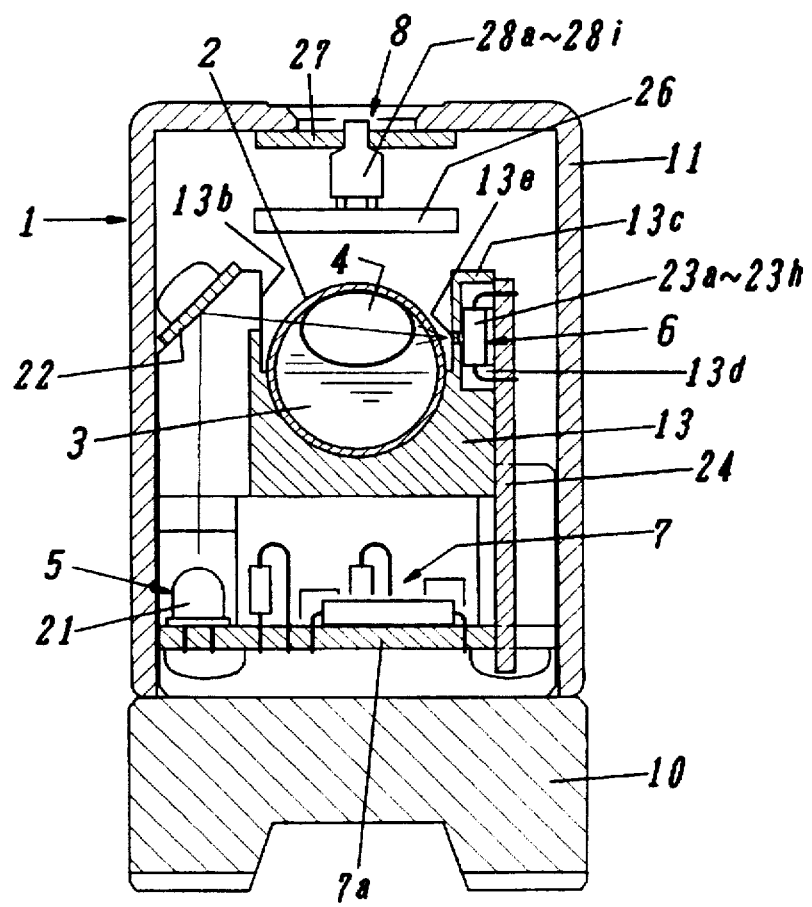
FIG. 2 is a transverse cross sectional view of the embodiment of FIG. 1.

As shown in FIGS. 2 and 3, the projector 5 has a light source 21 and a light reflector 22, disposed so that the light beams from the source 21 are made to travel across the level tube 2 from one side to its other side. The light source 21 is suitably a light-emitting diode or the like, and is disposed away downwardly and obliquely from the level tube 2, i.e. on one side end of a first printed circuit board of the discriminator circuit 7, disposed under the bed 13, with the light source 21 oriented upwardly. The light reflector 22 is a plane mirror disposed at a slant beside the level tube 2 to deflect the light beams emitted upwardly from the light source toward the level tube. The reflector 22 is supported by attachments 13a, 13b supported from the edge of the bed 13. Alternatively the reflector 22 can also be a prism.

As shown in FIGS. 2 and 3, the photoelectric sensor 6 has a plurality of photoelectric receptor elements 23a–23h such as phototransistors, photodiodes and the like which are arranged along the level tube 2 in an area to be irradiated with the light beams passing through the level tube 2. The photosensitive receptor elements 23a23h are suitably mounted in line on a printed circuit board 24, and are placed within a longitudinal recess 13d formed behind an exterior upward extension wall 13c projecting upwardly from one side portion of the bed 13. The circuit board 24 for the photoelectric sensor elements 23a–23h is firmly attached to the side face of the bed 13 with set screws. The upward extension wall 13c of the bed 13 has a plurality of light entrance apertures 13e formed in a line to allow the light beams that passed through the tube 2 to enter the recess 13d. The light entrance apertures 13e are arranged in line at appropriate intervals to face to the photoelectric sensors 23a–23h.

The discriminator circuit 7 is combined with the printed circuit board 7a which is under the bed 13 and above the base 10. The discriminator circuit 7 is supplied with electric power from a battery 25, and is adapted to discriminate between various combinations of reactions from photoelectric sensor elements irradiated with the light beams passing straight through the tube off the bubble (for example, a half of these on the left side thereof 23a–23d in FIG. 6) from among all the photoelectric sensors 23a–23h, according to their outputs. Consequently, it is possible to discriminate also the remaining nonreacting photoelectric sensors that had no light shine on them (for example the right half of them 23e–23h) directly at the back of the bubble within the level tube. The discriminator circuit 7 is further adapted to detect the levelness of the detector body 1 from the discrimination of the particular combination of those photoelectric sensors that reacted to light shining on them, and then to energize both the internal and external level indicators 8, 9 for indicating the levelness to the operator. The printed circuit board 7a of the discriminator circuit 7 is arranged at a right angle to the upright printed circuit board 24 for the photosensitive elements 23a–23b by coupling one side edge of the board 7a to a lower end of the board 24, and both of the circuits on the respective boards 7a, 24 are electrically interconnected to one another.

The internal and external level indicators 8, 9 have the same structure, and each comprises a plurality of indicator lamps 28a–28i, e.g. light-emitting diodes, mounted inline on another printed circuit board 26, and an attachment plate 27 for attaching the circuit board 26 to the respective cases 11, 30. The attachment plate 27 contains holes to hold the heads of the indicator lamps 28a–28i inline. With respect to the internal level indicator 8, the attachment plate 27 is attached internally to the upper side portion of the elongated rectangular case 11 while the indicator lamps 28a–28i held in part by the attachment plate 27, are exposed externally from an elongated opening 29 formed in the upper side portion of the case. With respect to the external levelness indicator 9, the attachment plate 27 is attached internally to an upper portion of an elongated rectangular case 30 while the indicator lamps are exposed externally from an elongated opening 31 formed in the upper portion of the box.

The indicator lamps 28a–28i of the internal level indicator 8 are directly connected to the discriminator circuit 7. On the other hand, external level indicator 9 is indirectly connected to the discriminator circuit 7. More particularly, the external level indicator 9 has an external cable 32 including wires associated with each of the indicator lamps 28a–28i. The cable 32 has a connector 33 at one end of the case 11 in the detector body 1. The external level detector 9 can be removed from the detector body 1 by separating the connectors 33, 34, when no remote observation by an operator is needed.

The battery 25 is replaceable, as shown in FIG. 3, and is kept in a storage space 35 partitioned in an end of the rectangular case 11 of the detector body 1, and supplies electric power to the light source 21 and the indicator lamps 28a–28i of the internal and external level indicators 8, 9 in addition to the discriminator circuit 7. The battery storage space 35 is closed by a detachable threaded lid 35a from the outside. A switch 36 for switching the electric power of the battery 25 is mounted on an edge of the end of the detector body 1.

As shown in FIG. 5, the bubble-containing level tube 2 is arcuate similarly to a simple common level gauge wherein a middle portion rises slightly relative to both end portions. Consequently, the bubble 4 floating within the level tube 2 stays in the longitudinal center position of the level tube 2 when the detector body 1 rests on a horizontal plane. The locations of the photoelectric sensor receptor elements 23a–23h of the photoelectric sensor 6 are determined along the level tube 2, based on the staying of the bubble 4 in the middle within the level tube 2. As shown particularly in FIGS. 4 and 6, a first half of eight photoelectric sensor receptor elements 23a–23h, i.e. four elements 23a–23d are arranged on the left side relative to transverse line tangent to an edge of the bubble 4 in the middle along the bubble-containing level tube 2, while the remaining four photoelectric sensor receptor elements 23e–23h are arranged on the right side relative to the transverse tangent line along the level tube 2. The four photoelectric sensor receptor elements on the right and the left are arranged respectively within a length along half of the total length of the bubble 4. Therefore, the four right photoelectric sensor receptor elements 23e–23h face to the left side of the bubble when it is in the center, but all of eight photoelectric receptor elements 23a–23h face the entire bubble when it is displaced leftward, as shown by a broken line in FIG. 6, near to an edge limit with the level tube 2 when the detector body 1 rests on a leftward rising inclined surface. When the detector body 1 rests on a rightward rising inclined plane, the bubble is displaced toward the right from it central portion, as shown by a broken line in FIG. 6, near to an edge limit within the tube 2 by removing itself from the four right electric photoelectric sensor receptor elements 23e–23h.

The plane mirror of the reflector 22 is of sufficient length to extend over all inclined photoelectric sensor receptor elements 23a–23h so that the light beams emitted from the projector 5 can travel toward all photoelectric sensor receptor elements.

When the detector body 1 rests on a genuinely horizontal surface, some of the light beams directed horizontally by the reflector 22 pass straight through the level tube 2 off the inside bubble 4 and then hit the four photoelectric sensor receptor elements 23a–23d on the left side, as shown in FIGS. 4 and 6. Some of the light beams are, however, reflected or refracted at the interface between the bubble and the liquid with the tube and are thus prevented from passing straight through the tube, and thus never shine on the four photoelectric sensor receptor elements 23e–23h on the right. When the detector body 1 is inclined upward to the left, the bubble is displaced from the central position to the left edge limit within the tube, and the left part of the bubble gradually moves all the way to being in front of all of the four left beams. This leftward displacement of the bubble interrupts the transverse passages of the light beams toward the four left photoelectric receptor elements 23a–23d, and prevents the light beams from shining on the four left photoelements 23a–23d.

When in the schematic of FIG. 6 the detector is tilted by rising rightward, the bubble is displaced from the central position toward the right edge limit within the level tube, and gradually covers all of the four right photoelectric receptor elements 23e–23h. Accordingly, the light beams directed toward the four right photoelectric receptor elements 23e–23h will travel straight without the interruption by the bubble and shine on from one to all of the four right photoelectric elements 23e–23h in sequence from the innermost element 23e to the outermost element 23h.

Table 1 shows every pattern of combination of the photoelectric receptor elements irradiated with the light beams, from among eight photoelectric sensor elements 23a–23h in all, which vary with the inclination of the detector body 1 relative to the horizontal or level position. A combination of the four left photoelectric sensor elements 23a–23d irradiated by light beams is represented by reaction pattern H, and indicates that the detector body 1 is placed in a horizontal, level position. A combination of the three left photoelectric elements 23a–23c irradiated with the light beams is represented by reaction pattern L1, and indicates that the detector body 1 is slanted upwardly to the left at a gradient of 0.1 to 100. Next, a combination of the two photoelectric elements 23a, 23b on the left side irradiated with the light beams is represented by reaction pattern L2, and indicates that the detector body 1 is slanted upwardly to the left at a gradient of 0.3 to 100. Next, a combination of only one photoelectric sensor element 23a that is the outermost one on the left side irradiated upwardly to the left at a gradient of 0.3 to 100. Next, a combination of only one photoelectric sensor element 23a that is the outermost one on the left side irradiated with light beams is represented by the pattern L3, and it indicates that the detector body 1 is slanted upwardly to the left at a gradient of 0.6 to 100. Next, a combination free of any of the photoelectric sensor elements 23a–23d on the left side is represented by the reaction pattern L4, and it indicates that the detector body 1 is slanted upwardly to the left at a gradient of 1.0 to 100 in which the bubble is displaced to the left edge limit within the tube. Reaction patterns R1, R2, R3 and R4 are similarly established according to combinations of any photoelectric sensor element 23e–23h on the right side irradiated with the light beams, and indicate that the detector body 1 is slanted upwardly to the right at a gradient of 0.1 to 100, 0.3 to 100, 0.6 to 100, and 1.0 to 100, respectively.

TABLE 1

| Lamps | 28a | 28a | 28c | 28d | 28e | 28f | 28g | 28h | 28i |
|---|---|---|---|---|---|---|---|---|---|
| Lighting colors | red | red | orange | yellow | green | yellow | orange | red | red |
| inclination | ← upwards to left | | | | horizontal | | | upwards to right → | |

TABLE 1-continued

| Gradient (×1/100) | 1.0 | 0.6 | 0.3 | 0.1 | 0 | 0.1 | 0.3 | 0.6 | 1.0 |
|---|---|---|---|---|---|---|---|---|---|
| Patterns | L4 | L3 | L2 | L1 | H | R1 | R2 | R3 | R4 |
| Photosensitive Elements left→right 23a | | O | O | O | O | O | O | O | O |
| 23b | | | O | O | O | O | O | O | O |
| 23c | | | | O | O | O | O | O | O |
| 23d | | | | | O | O | O | O | O |
| 23e | | | | | | O | O | O | O |
| 23f | | | | | | | O | O | O |
| 23g | | | | | | | | O | O |
| 23h | | | | | | | | | O |

The symbol "O" denotes the photoelectric sensor elements irradiated with the light beams passed through the tube.

Based on the output of the photoelectric sensor elements irradiated with the light beams, the discriminator circuit 7 discriminates various combinations of the reacting photoelectric elements of the aforedescribed reaction patterns and then selectively energizes the indicator lamps 28a–28i of the internal and external level indicators 8, 9. The indicator lamps 28a–28i are so arranged that they correspond to nine different degrees of levelness. The discriminator circuit 7 is designed to turn on one indication lamp 28e at the center according to the reaction pattern H on the basis of a horizontal level, and to turn on the indicator lamps 28d, 28c, 28b, 28a on the left side according to the reaction patterns L1, L2, L3 and L4, respectively, due to leftward rising inclinations, and to turn on the indicator lamps 28f, 28g, 28h, 28i on the right side according to the reaction patterns R1, R2, R3 and R4, respectively, due to rightward rising inclinations. The indicator lamps 28a–28i each have different colors when lit, as shown in Table 1. The central lamp 28e is green when lit, and in the order of increased inclination the lamps 28d and 28f are yellow when lit, the lamps 28c and 28f being red when lit, and the lamps 28b, 28a, 28h, 28i are also red when lit, wherein the lamps 28b, 28h can be differentiated from the lamps 28a, 28i by separate lighting colors according to the respective slant angles.

The photoelectric sensor 6 can also have a different construction, and can be modified, for example, as shown in FIG. 7. In this embodiment of the present invention the photoelectric sensor elements 23a–23h are disposed remotely from the light entrance apertures 13e in the upward extension wall 13c of the bed 13, but are connected to the light entrance apertures 13e by a plurality of interposed optical fibers 50a–50h to conduct the light beams which have passed through the tube and entered the light entrance apertures.

Figure 8:
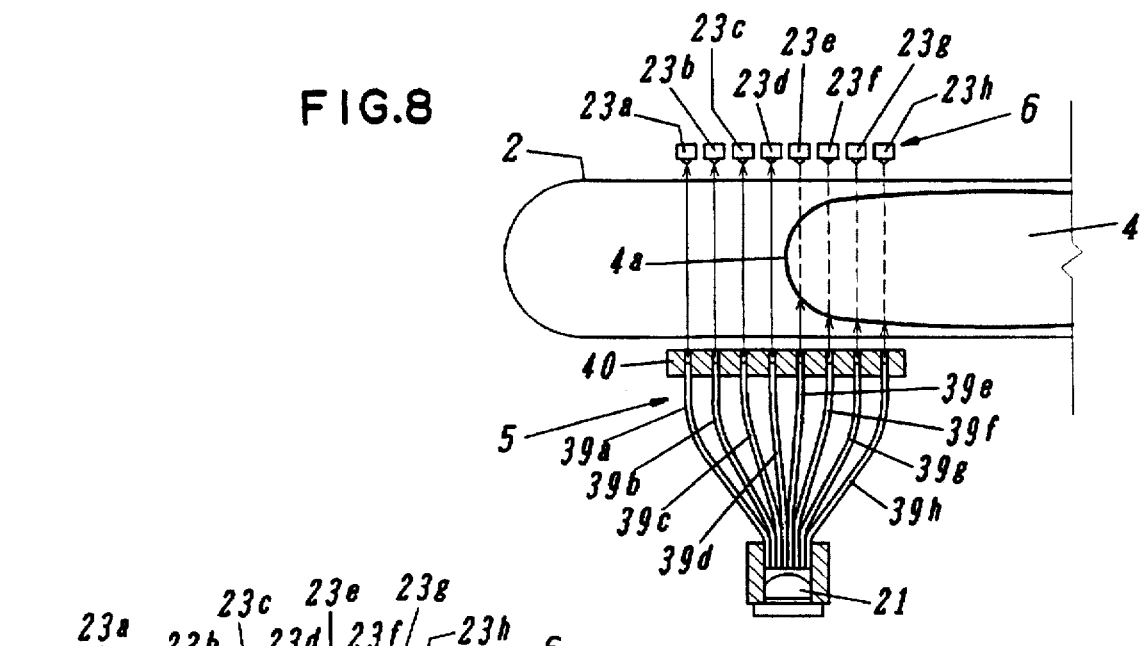
FIG. 8 is a schematic plan view, illustrating a modification of the projector of FIG. 6.
Figure 9:
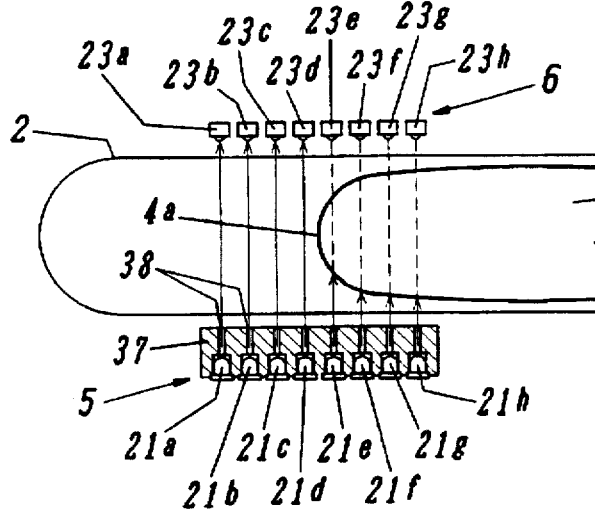
FIG. 9 is a schematic plan view, illustrating another modification of the projector of FIG. 6.
Figure 10:
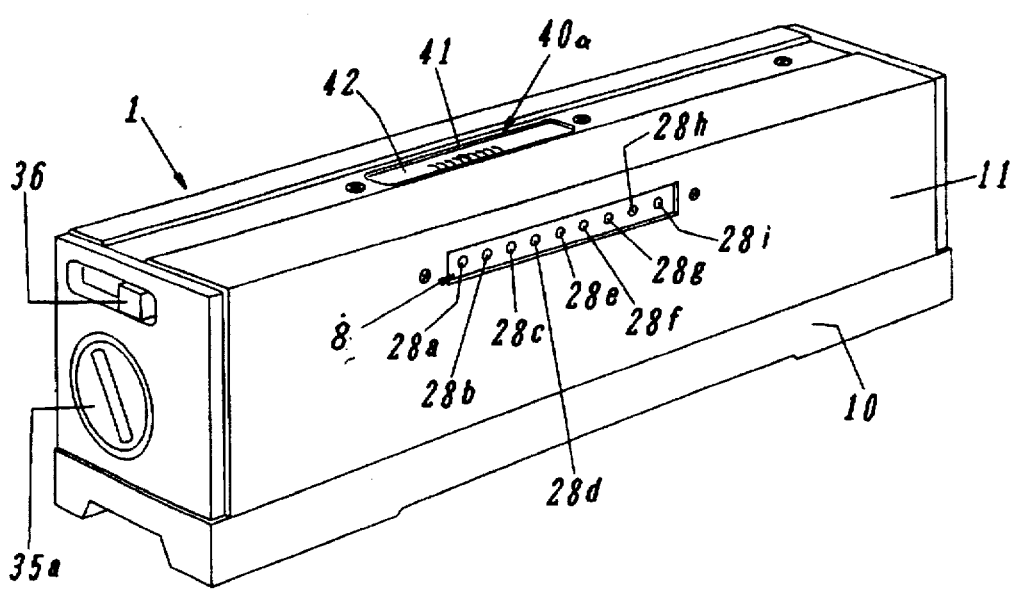
FIG. 10 is a perspective view of a second embodiment of the invention.
Figure 11:
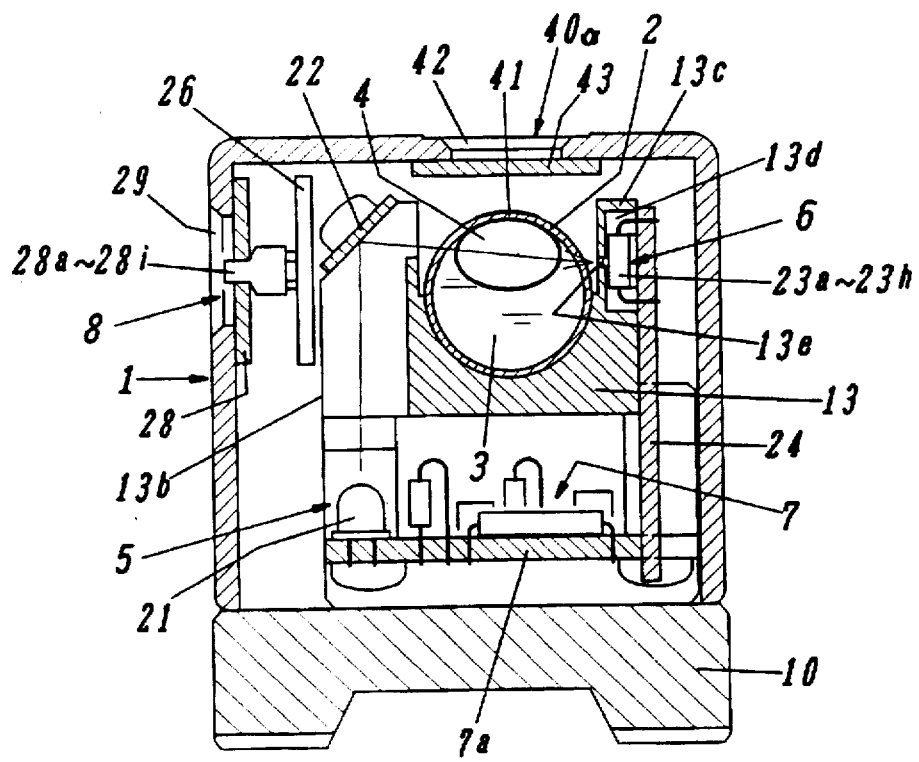
FIG. 11 is a transverse cross sectional view of the embodiment of FIG. 10.
Figure 13:
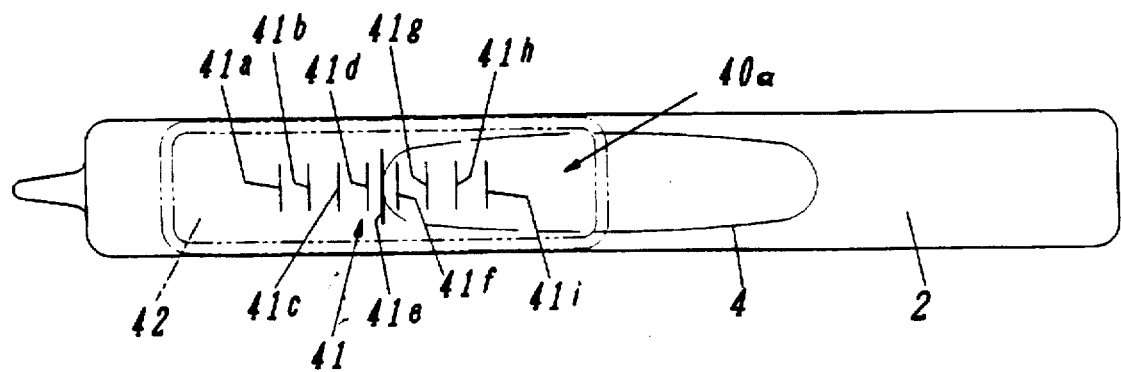
FIG. 13 is a plan view of a bubble-containing level tube used of the embodiment of FIG. 10.

The projector 5 can also be modified as shown in FIGS. 8 and 9. In FIG. 8, a different modification of the projector includes a light source 21, a plurality of optical fibers 39a–39h arranged to distribute the light from the source 21 to points opposite to the photoelectric receptor sensor elements 23a–23h, and a holder 40 for locating the light outlets of the optical fibers 39a–39h.

In FIG. 9 a modification of the projector 5 has many light sources 21a–21h e.g. as many light emitting diodes, as there are photoelectric sensor elements 23a–23h in the light receptor 6, and a holder 37 holds the light sources 21a–21h, and is disposed opposite to the photoelectric elements 23a–23h with the level tube 2 between them. The holder 37 has apertures 38 for controlling by confining the light beans from the light sources 21a–21h in their courses toward the corresponding photoelectric sensor elements 28a–23h.

Suitably the projector 5 is arranged so that the light travels horizontally toward the level tube 2, but the light also can travel vertically.

FIGS. 10 to 13 show a different embodiment of a level detector of the present invention, wherein those parts that the second embodiment that are in common with the first embodiment, are not described separately. The top of the elongated rectangular case 11 of the detector body 1 has an observation port 40a containing a marked scale for marking the levelness of the detector body 1 by allowing observation of the relative position of the bubble within a bubble containing level tube 2.

The observation port 40a containing the scale is comprised of an elongated rectangular opening 42 formed in the top of the case 11, and a transparent protective plate 43 such is of glass, covers the opening from the inside. A scale 41 is marked directly on an upper surface of the bubble-containing level tube 2 in a different manner than in a common level tube used by observation by an operator. As shown particularly in FIG. 13, the scale is marked with a reference line 41e for the horizontal position, four inclination indication lines 41a–41d on the left of the reference line, and four inclination lines 41f–41i on its right. The reference line 41e is in a position on a vertical plane tangent to an edge of the bubble 4 within the level tube 2 when the detector body 1 rests on a genuinely horizontal plane. The inclination lines 41a–41d and 41f–41i respectively on the left and right are each in a location according to the positions of the edge of the bubble that is displaced when the detector body 1 is positions of the edge of the bubble that is displaced when the detector body 1 is slanted upwardly to the left and to the right, to each of the predetermined gradations. These gradations can be established to correspond to the gradations at which the indication lamps 28a–28i each are lit. If desired, the angular inclination or some arbitrary values of the gradations can be marked at with the corresponding indication lines. If the transparent protective plate 43 is disposed nearer to the bubble-containing level tube 2, the scale can also be marked directly on the protective plate 42.

There is also a discriminator circuit 7 in this second embodiment of the present invention, for detecting the stepwise grades of inclination from a reaction of the photoelectric sensor elements 23a–23h positioned in a line at intervals to indicate the stepwise grades of inclination to an operator through the external level indicator 9. However, in the case where the operator wants to determine by observation a more accurate degree of inclination or a direction of inclination, the operator can determine that by determining the relative position of the edge of the bubble 4 from the marked scale 41 through the observation port 40a.

There is a possibility that the observation port 40a will create an unexpected result when external natural light enters the light entrance apertures 13e in the detector body 1 and then hits the photosensitive elements 23a–23h of the light receptor 6 and results in a malfunctioning of the discriminator circuit 7. The light entrance apertures 13e should be formed to overcome the problem by having a sufficient length to allow horizontal direction only. Alternatively, the light source 21 of the projector 5 could be an infrared emitter and the photoelectric sensor elements 23a–23h of the light receptor 6, should be responsive to infrared radiation so that the photoelectric sensor elements 23a–23h will in that case not react anomalously to any natural light entering through the observation port 40a.

As best shown in FIG. 12, no internal level indicator is arranged in the detector body 1 in the second embodiment of the present invention, and only an external level indicator 9 is used. In addition, the external indicator 9 rather than the detector body 1, contains the battery 25 and a power switch 36 is provided for switching the electric power of the battery 25 to the projector 5, the receptor 6 and the discriminator circuit 7 on the detector body by way of an external cable 32. However, the power switch 36 can be omitted because a connector 34 on the detector body 1 and a connector 33 on the external indicator 9 can also be used for connecting and disconnecting.

In use of the level detector, the detector body 1 is first laid on a surface of an object to be tested, and then the power switch 36 is closed, whereby the light from the source 21 of the projector 5 cause the lighting up of any of the indicator lamps 28a–28i of the internal and/or external level indicators 8, 9 according to the levelness of the surface of the object. The operator can determine the levelness of the object from the lighting and color of the indicator lamps 28a–28i. If the operator is in a position that he can determine the levelness readily from the internal indicator 8 alone, then the position that he can determine the levelness readily from the internal indicator 8 alone, then the external indicator 9 can be removed from the detector body 1. However, the external indicator 9 can be set up remotely from the detector body 1 for easy observation.

The adjusting mechanism 12 is used for adjusting the vertical location of the level tube 2 relative to the detector body 1 on the object. When the bubble-containing level tube 2 is supported on the bed 13 out of its normal position within the detector body 1, the indicator 8, 9 will not provide a horizontal level indication signal through the corresponding lamp in relation to a true horizontal surface of the object. In that a case, the bed 13 with the tube 2 should be adjusted by turning the screw shaft 14 for the bed 13 to assume a position parallel to the base 10 so that the shoulder in the middle of the shaft should adjust the vertical location of one end 18 of the bed 13. The turning of the screw shaft 14 inwardly pushes the opposite end 18 of the bed 13 downwardly relative to the base 16 of the other end of the bed 13. Unscrewing of the screw shaft 14 restores the opposite end 18 of the bed 13 in its original upper position by the action of the intervening spring plate-like portion 15.

The level indicators 8, 9 are adapted to indicate the levelness by the lighting and color of the indicator lamps 28a–28i. The level indicators of the present invention can also be adapted to indicate the levelness by sound only or in combination of sound and light. The level detector of the present invention can be applied to determine the verticality of a vertical plane by use of an L-shaped supplemental member forming a right angle. Two additional level detectors can be used together for two directions crossing at a right angle on a horizontal plane to detect the levelness of the different directions.

The level detector of the present invention can be manufactured at a relatively low cost, and is superior both as far as reliability and durability are concerned while employing a relatively uncomplicated construction.

In the level detector of the present invention, no means are required for conducting the light from the light entrance apertures 13e to the photoelectric receptor elements 23a–23h of the photoelectric sensor 6, which are arranged in a line along the bubble-containing level tube 2 in the area to be irradiated with light arriving from across the bubble-containing level tube 2. Thus, the construction can be simplified, be of a small size, all contributing to a substantial reduction of the cost of the device.

In the level detector of the present invention the spacing of the light entrance apertures 13e can be shortened without being restricted by the width of the photoelectric sensor elements 23a–23h, because the photoelectric receptors 23a–23h of the light sensor 6 can be remotely from the bubble-containing tube 2. In that case a plurality of optical fibers 50a–50h are associated with an area to be irradiated with the light arriving from across the bubble-containing level tube 2. Thus, the degree of accuracy of the measurement can be enhanced by a greater number of the apertures 13e and photoelectric sensor elements.

In the level detector of the present invention the number of necessary parts is reduced to render the structure simpler and inexpensive, when the projector 5 includes a light source 21, and a light reflector 22 for changing the direction of the light emitted from the source 21 toward and across the bubble-containing tube 2. The layout of the parts is also easy to design.

The level detector of the present invention provides an enhanced accuracy of measurement, because the projector 5 has a plurality of light emitters 21a–21h arranged opposite to each of the photoelectric receptor elements 23a–23h of the photoelectric sensor 6 with the interposed level tube 2 and thus providing independent directions for the various beams of light, and also because the optical fibers 39a–39h are arranged to distribute the light from the light source 21 opposite to each of the photoelectric receptor elements 23a–23h.

In the level detector of the present invention the levelness of a surface can be readily and certainly determined by simply identifying the lamps that are lit. Because the level indicator 8, 9 has a plurality of indicator lamps 28a–28i that correspond to a plurality of predetermined grades and gradations, and the discriminator circuit 7 selec In the level detector of the present invention, the levelness of a surface can also be readily determined from the detector body, which contains the level indicator 8.

In the level detector of the present invention the efficiency of measurement can be enhanced because the level indicator can be set at any desired position, height or direction irrespective of the position of the detector body, because the level indicator 9 is arranged in the external case 30, and is electrically connected to the detector body 1 by an external cable 32.

The level detector of the present invention can be simply assembled, because the vertical position of the bubble-containing level tube 2 can be adjusted relative to the detector body 1 by the adjusting mechanism 12.

In the level detector of the present invention, there is no need for a spring coil adapted to bias the end of the bed 13, or for a mechanism for raising or lowering the end of the bed 13. This is, because the number of parts can be reduced with a simplified structure, as the adjusting mechanism 12 includes a bed 13 for stabilizing the bubble-containing tube, and a screw shaft 14, and one end of the bed 13 has a spring-plate-like portion 15 and a base 16 secured to the detector body 1, and the opposite end of the body 13 is free and is displaceably depressed by the screw shaft 14.

In the level detector of the present invention, the levelness of the detector body 1, can be simply measured by observing a relative position of the bubble 4 directly within the bubble-containing tube 2, due to the scale-marked observation port 40a. Thus, it is possible to compare the true levelness of the object with the indication of the level indicator 8, 9. Even when the indicator 8, 9 shows that the surface is horizontal, the operator can confirm whether the object is truly horizontal or is slanted upwardly to the right or to the left. The observation port 40a is convenient for those who are familiar with classic instrumentation using visual observation, and is superior to it in its versatility.

In the level detector of the present invention the size and weight of the detector body 1 can be reduced for easy handling due to the battery 25 being located in the external case 30.

In the level detector of the present invention a switch is not required for the power source and the operational efficiency can thus be enhanced. The detector body 1 and the cable 32 each having connectors 33, 34, are detachable from each other and a power supply circuit including the battery 25 can thereby be opened and closed.

In the level detector to the present invention it is possible to prevent a false signal due to incident natural light, and thus the accuracy of the measurement can be enhanced, because the projector 5 can be an infrared emitter, and the photoelectric sensor elements 23a–23h of the light receptor 6 can be correspondingly infrared sensitive. Accordingly, any reference herein to "light" also includes infrared radiation.

I claim:

1. A levelness detector which comprises an elongated level tube having a longitudinal axis and containing a bubble in a liquid, a detector body for supporting said level tube therein, an electric projector for providing directly emitted light, means for directing said emitted light for passing across said level tube, a photoelectric sensor adapted to sense said emitted light and having a plurality of separate photoelectric receptor elements, said sensor and its receptor elements being arranged to receive the light arriving from across said level tube, said projector and said sensor being secured at predetermined positions relative to said level tube in said detector body, a discriminator circuit for identifying selected receptor elements to determine the location of light arriving across said level tube without interference by the bubble therein and thus to detect the levelness of said detector body, and at least one level indicator for providing a readout of said levelness.

2. The levelness detector of claim 1, wherein said photoelectric receptor elements are arranged in a line parallel to the longitudinal axis of said level tube at a location where said light arrives from across said level tube.

3. The levelness detector of claim 1, further comprising a bed within said detector body, said bed supporting said level tube therein, the detector further comprising calibrating means for adjusting the inclination of said bed with said level tube.

4. The levelness detector of claim 2, wherein photoelectric receptor elements are located remotely from said detector body, the level detector further comprising a plurality of optical fibers for conducting said arriving light from where it exits said level tube to said photoelectric receptor elements.

5. The levelness detector of claim 1, wherein said projector has a light source, a light reflector for changing the direction of the light from said light source across said level tube.

6. The levelness detector of claim 1, wherein said projector has a plurality of light sources located across said level tube from said photoelectric receptor elements.

7. The levelness detector of claim 1, wherein said projector has a light source, and a plurality of optical fibers for distributing light from said light source to locations across said level tube from said photoelectric receptor elements.

8. The levelness detector of claim 1, wherein said level indicator has a plurality of indicator lamps each corresponding to a predetermined degree of tilting of said detector body, said discriminator circuit being adapted selectively to energize said indicator lamps according to said tilting.

9. The levelness detector of claim 8, wherein said level indicator is within said detector body.

10. The levelness detector of claim 8, further comprising a case, said level indicator being remote from said detector body within said case, and a cable for connecting said level indicator from said detector body.

11. The levelness detector of claim 8, further comprising an elongated bed within said detector body, said bed supporting said elongated level tube therein, the detector further comprising calibrating means for adjusting the inclination of said bed with said level tube.

12. The levelness detector of claim 11, wherein said elongated bed has first and second ends, calibrating means comprises a threaded shaft, a spring-plate-like part at the first end of said bed, an attachment part attaching said spring-plate-like part to the detector body, said threaded shaft being adapted to raise or to lower said second end of said bed within said detector body.

13. The levelness detector of claim 8, further comprising an observation window containing a graduated observation scale for determining the levelness of said detector body by observing the relative position of the bubble within said level tube.

14. The levelness detector of claim 10, further comprising a battery disposed within said case.

15. The levelness detector of claim 10, further comprising detachable connector members for coupling said cable to said detector body.

16. The levelness detector of claim 14, further comprising detachable connector members for selectively connecting said battery from said detector body.

17. The levelness detector of claim 1, wherein said projector is adapted to emit infrared light, and said photoelectric receptor elements are infrared photoreceptors.

* * * * *